(12) United States Patent
Wang et al.

(10) Patent No.: US 10,741,338 B1
(45) Date of Patent: Aug. 11, 2020

(54) CONTACT DEVICE OF HANDCART CIRCUIT BREAKER AND HANDCART CIRCUIT BREAKER

(71) Applicants: XJ ELECTRIC CO.,LTD, Xuchang (CN); XJ GROUP CORPORATION, Xuchang (CN)

(72) Inventors: Junwei Wang, Zhoukou (CN); Bangtian Wang, Xuchang (CN); Pengcheng Sun, Xuchang (CN); Weiguo Yang, Xuchang (CN); Siliang Yang, Xuchang (CN); Ran Wei, Xuchang (CN); Xiaopeng Li, Xuchang (CN); Xiaoyu Deng, Xuchang (CN); Libo Zuo, Shangqiu (CN); Jinfang Wang, Xuchang (HN); Liping Shi, Xuchang (CN); Miao Wang, Nanyang (CN)

(73) Assignees: XJ ELECTRIC CO., LTD, Xuchang (CN); XJ GROUP CORPORATION, Xuchang (CN)

( * ) Notice: Subject to any disclaimer, the term of this patent is extended or adjusted under 35 U.S.C. 154(b) by 0 days.

(21) Appl. No.: 16/536,683

(22) Filed: Aug. 9, 2019

(51) Int. Cl.
*H01H 33/662* (2006.01)
*H01H 1/38* (2006.01)
(Continued)

(52) U.S. Cl.
CPC ............ *H01H 1/38* (2013.01); *H02B 11/167* (2013.01); *H01H 1/62* (2013.01); *H01H 2203/048* (2013.01); *H01H 2235/00* (2013.01)

(58) Field of Classification Search
CPC .... H01H 33/66; H01H 33/596; H01H 33/666; H01H 33/664; H01H 33/662; H01H 33/6661; H01H 11/00; H01H 1/385; H01H 1/62; H01H 2009/0285; H01H 2033/6623; H01H 2033/66276; H01H 33/027; H01H 33/04; H01H 33/6606; H01H 33/66207; H01H 33/6662; H01H 69/00; H01H 71/08;
(Continued)

(56) References Cited

U.S. PATENT DOCUMENTS 6,828,521 B2 * 12/2004 Stoving ................ H01H 33/666
                                                           218/134
8,530,775 B2 *  9/2013 Gentsch ............. H01H 33/6606
                                                           218/120
(Continued)

*Primary Examiner* — Ahmed M Saeed
(74) *Attorney, Agent, or Firm* — CMB Patent Consulting, LLC

(57) ABSTRACT

Provided is a handcart circuit breaker and a contact device thereof including a contact arm and a moving contact. Inner walls of a cylindrical contact finger base in axial direction respectively have a contact finger groove with a spring contact finger for plugging the contact arm and a fixed contact; a rear of the contact finger base sleeves with a front of the contact arm having a positioning groove larger than a fitting end of the support pin, the contact finger base has support pins extending into the contact finger base; a diameter of a circle corresponding to the fitting end of each support pin is larger than a diameter of a circle corresponding to a bottom of each positioning groove; the contact finger base connects with the contact arm and an elastic support structure is arranged between the contact arm and the inner wall of the contact finger base.

10 Claims, 4 Drawing Sheets

(51) Int. Cl.
*H02B 11/167* (2006.01)
*H01H 1/62* (2006.01)

(58) Field of Classification Search
CPC .... H01H 9/02; H01H 9/52; H01H 2033/6665; H01H 2033/66284
See application file for complete search history.

(56) References Cited

U.S. PATENT DOCUMENTS

| | | | |
|---|---|---|---|
| 10,134,553 B2* | 11/2018 | Jing | H01H 69/00 |
| 10,453,624 B2* | 10/2019 | Tu | H02B 11/04 |
| 10,614,981 B2* | 4/2020 | Lee | H01H 33/66207 |
| 2008/0087647 A1* | 4/2008 | Volkmar | H01H 33/66207 |
| | | | 218/134 |
| 2014/0138357 A1* | 5/2014 | Kasza | H01H 11/00 |
| | | | 218/134 |

* cited by examiner

CONTACT DEVICE OF HANDCART CIRCUIT BREAKER AND HANDCART CIRCUIT BREAKER

TECHNICAL FIELD

The present invention relates to the field of circuit breaker technologies, and more particularly, to a contact device of a handcart circuit breaker and a handcart circuit breaker.

BACKGROUND

A handcart circuit breaker is a switching device frequently used in the prior art, which has a structure as that in a circuit breaker disclosed in CN208045397U and CN107622922A, and mainly comprises a chassis truck and a fixedly sealed pole arranged on the chassis truck, wherein a side surface of the fixedly sealed pole is provided with a contact arm, and the contact arm is connected with a tulip contact.

A tulip contact structure in the prior art is shown in FIG. 1. A tulip contact 10 includes a tulip contact body 11 and a spring installed on the tulip contact body 11. The tulip contact body 11 includes evenly distributed tulip contact pieces 12 that are tightly clamped by the spring and support pieces 13 for enclosing and fixing each tulip contact piece 12, and the evenly distributed tulip contact pieces 12 extend inwardly and form a plug cavity 14 matched with the contact arm and a fixed contact. The spring for clamping the tulip contact pieces 12 includes an inner spring 15 and an outer spring 16 which are arranged at an interval in an axial direction, and used for providing a sufficient elastic force to fix the tulip contact pieces 12 in the support pieces 13, and clamping the tulip contact pieces 12 when the tulip contact 10 is plugged with the fixed contact to ensure stable electrical connection. However, the tulip contact has a large meshing force, which will cause the circuit breaker to have a "climbing" phenomenon of slowly switching on in a creeping manner.

SUMMARY

One object of the present invention is to provide a contact device of a handcart circuit breaker used for solving the problem of switching on affected by the large meshing force of the tulip contact in the prior art; and another object of the present invention is to provide a handcart circuit breaker using the contact device, which has the advantages of small switching on resistance and stable switching on action.

In order to achieve the objects above, the following technical solution is employed in the contact device of the handcart circuit breaker according to the present invention.

A contact device of a handcart circuit breaker includes a contact arm and a moving contact, a rear end of the contact arm is a pole fixing end, a front end of the contact arm is a contact connecting end, the rear end of the contact arm is provided with a pole fixing structure for being fixed on a fixedly sealed pole of a handcart circuit breaker, and the front end of the contact arm is provided with a moving contact assembling structure for assembling the moving contact;

the moving contact includes a contact finger base and a spring contact finger, wherein:

the contact finger base has a cylindrical structure, inner walls at two ends of which in an axial direction are respectively provided with a contact finger groove, the contact finger grooves at the two ends are respectively provided with the spring contact finger, and the spring contact fingers at the two ends are respectively used for plugging the contact arm and a fixed contact;

a rear end of the contact finger base is sleeved on the front end of the contact arm, and the contact finger base is provided with more than three support pins extending into an inner cavity of the contact finger base;

a positioning groove is arranged in a peripheral surface of the front end of the contact arm for sleeving the contact finger base, and the positioning groove is matched with the support pin;

in an axial direction of the contact arm, a size of the positioning groove is larger than a size of a fitting end of the support pin; a diameter of a circle corresponding to the fitting end of each support pin is larger than a diameter of a circle corresponding to a groove bottom of each positioning groove; and the contact finger base is connected with the contact arm in a floatable manner through the matching of the support pin and the positioning groove; and an elastic support structure is arranged between the peripheral surface of the contact arm and the inner wall of the contact finger base, and the elastic support structure is located below the contact device in use to correct downward inclination of a front part of the contact finger base.

The beneficial effects lie in that: the spring contact finger is arranged in the contact finger base to realize the electrical connection of the contact finger base with the contact arm and the fixed contact respectively, the support pin and the positioning groove are arranged between the contact finger base and the contact arm, the floating connection and automatic alignment of the contact arm and the contact finger base are realized through the matching of a positioning pin and the positioning groove, and the elastic support structure is arranged between the peripheral surface of the contact arm and the inner wall of the contact finger base, so as to overcome a downward inclination gravity of the contact finger base to correct the downward inclination of the front part of the contact finger base; and the spring contact finger has a small meshing force, which can reduce a switching on resistance of the circuit breaker, so that when the spring contact finger is used in the handcart circuit breaker, the meshing force is small in a plugging fit process of the contact finger base and the fixed contact, and the switching on action is smooth.

Further, the positioning groove is an arc-shaped groove with an arc-shaped cross-sectional profile, and the fitting end of the support pin is of a bulb structure.

The beneficial effect lies in that: the arc-shaped groove is matched with the bulb structure, which facilitates the floating connection of the contact finger base with the contact arm, and can reduce abrasion of the contact arm and the contact finger base in a position adjustment process.

Further, the contact finger base is provided with a threaded hole extending along a radial direction of the contact finger base, and the support pin is provided with an external thread matched with the threaded hole, so that the support pin is arranged in the contact finger base by threaded connection.

The beneficial effect lies in that: the use of a threaded connection structure to fix the support pin can ensure a connection reliability of the support pin, so as to ensure stable support to the contact arm, and the operator uses the threaded structure to adjust the position of the support pin relative to the contact finger base.

Further, the peripheral surface of the contact arm is provided with a circular groove arranged along a circumferential direction of the contact arm, the circular groove correspondingly forms the positioning groove, and the circular groove is internally provided with an anti-rotation limiting pin in stop fit with the contact finger base to limit rotation of the contact finger base.

The beneficial effect lies in that: the circular groove is used as the positioning groove to facilitate processing, and the anti-rotation limiting pin arranged in the circular groove can ensure relative positions of the contact arm and the contact finger base.

Further, the contact finger base is provided with a through hole along the radial direction of the contact finger base, and the through hole is used for the anti-rotation limiting pin to pass through to be connected with the contact arm in the contact finger base.

The beneficial effect lies in that: by arranging the through hole for the anti-rotation limiting pin to pass through in the contact finger base, the operator can limit the rotation of the contact finger base after arranging a contact arm support in the contact finger base, thus simplifying operation steps and reducing a task load.

Further, more than two elastic support structures are arranged.

The beneficial effect lies in that: the increase of a number of the elastic support structures can ensure an accuracy of a corrected posture of the contact finger base.

Further, the elastic support structure includes a blind hole arranged in the peripheral surface of the contact arm along the radial direction of the contact arm, a support rod is arranged in the blind hole, and the elastic support structure further includes a spring arranged between the support rod and a bottom of the blind hole.

The beneficial effect lies in that: the combination of the support rod and the spring is used as the elastic support structure, which is simple in structure and convenient to realize.

Further, the peripheral surface of the contact finger base is provided with a heat dissipation groove extending along a circumferential direction to increase a heat exchange area of the contact finger base.

The beneficial effect lies in that: a concave-convex structure of the heat dissipation groove increases the heat exchange area of the contact finger base, so that heat can be better dissipated to ensure a working stability, and a weight of the contact finger base can also be reduced by arranging the heat dissipation groove, and a downward inclination degree of the contact finger base is reduced, so that the posture of the contact finger base can be corrected without very large force.

Further, the contact finger base is provided with heat dissipation holes located at two opposite sides of the peripheral surface of the contact finger base, wherein a position of the heat dissipation hole at one side is corresponding to the elastic support structure.

The beneficial effect lies in that: the heat dissipation holes are arranged in the contact finger base, thus reducing the weight of the contact finger base, and correspondingly reducing a pressure on the contact arm and the downward inclination degree of the contact finger base. Meanwhile, the heat dissipation hole at one side is corresponding to the elastic support structure, so that the heat dissipation holes arranged at two opposite sides are respectively located at a top part and a bottom part of the contact finger base, and heat can be better discharged through the heat dissipation holes; and moreover, the heat dissipation holes are arranged in the top part and the bottom part of the contact finger base, which facilitates processing compared with a mode of uniform distribution along the circumferential direction of the contact finger base.

In order to achieve the objects above, the following technical solution is used in the handcart circuit breaker in the present invention.

A handcart circuit breaker includes a chassis handcart, a fixedly sealed pole and a contact device arranged on the fixedly sealed pole, a contact device of the handcart circuit breaker includes a contact arm and a moving contact, a rear end of the contact arm is a pole fixing end, a front end of the contact arm is a contact connecting end, the rear end of the contact arm is provided with a pole fixing structure for being fixed on a fixedly sealed pole of a handcart circuit breaker, and the front end of the contact arm is provided with a moving contact assembling structure for assembling the moving contact;

the moving contact includes a contact finger base and a spring contact finger, wherein:

the contact finger base has a cylindrical structure, inner walls at two ends of which in an axial direction are respectively provided with a contact finger groove, the contact finger grooves at the two ends are respectively provided with the spring contact finger, and the spring contact fingers at the two ends are respectively used for plugging the contact arm and a fixed contact;

a rear end of the contact finger base is sleeved on the front end of the contact arm, and the contact finger base is provided with more than three support pins extending into an inner cavity of the contact finger base;

a positioning groove is arranged in a peripheral surface of the front end of the contact arm for sleeving the contact finger base, and the positioning groove is matched with the support pin;

in an axial direction of the contact arm, a size of the positioning groove is larger than a size of a fitting end of the support pin; a diameter of a circle corresponding to the fitting end of each support pin is larger than a diameter of a circle corresponding to a groove bottom of each positioning groove; and the contact finger base is connected with the contact arm in a floatable manner through the matching of the support pin and the positioning groove; and an elastic support structure is arranged between the peripheral surface of the contact arm and the inner wall of the contact finger base, and the elastic support structure is located below the contact device in use to correct downward inclination of a front part of the contact finger base.

The beneficial effects lie in that: the spring contact finger is arranged in the contact finger base to realize the electrical connection of the contact finger base with the contact arm and the fixed contact respectively, the support pin and the positioning groove are arranged between the contact finger base and the contact arm, the floating connection and automatic alignment of the contact arm and the contact finger base are realized through the matching of a positioning pin and the positioning groove, and the elastic support structure is arranged between the peripheral surface of the contact arm and the inner wall of the contact finger base, so as to overcome a downward inclination gravity of the contact finger base to correct the downward inclination of the front part of the contact finger base; and the spring contact finger has a small meshing force, which can reduce the switching on resistance of the circuit breaker, so that when the spring contact finger is used in the handcart circuit breaker, the meshing force is small in a plugging fit process of the contact finger base and the fixed contact, and the switching on action is smooth.

Further, the positioning groove is an arc-shaped groove with an arc-shaped cross-sectional profile, and the fitting end of the support pin is of a bulb structure.

The beneficial effect lies in that: the arc-shaped groove is matched with the bulb structure, which facilitates the floating connection of the contact finger base with the contact arm, and can reduce abrasion of the contact arm and the contact finger base in a position adjustment process.

Further, the contact finger base is provided with a threaded hole extending along a radial direction of the contact finger base, and the support pin is provided with an external thread matched with the threaded hole, so that the support pin is arranged in the contact finger base by threaded connection.

The beneficial effect lies in that: the use of a threaded connection structure to fix the support pin can ensure a connection reliability of the support pin, so as to ensure stable support to the contact arm, and the operator uses the threaded structure to adjust the position of the support pin relative to the contact finger base.

Further, the peripheral surface of the contact arm is provided with a circular groove arranged along a circumferential direction of the contact arm, the circular groove correspondingly forms the positioning groove, and the circular groove is internally provided with an anti-rotation limiting pin in stop fit with the contact finger base to limit rotation of the contact finger base.

The beneficial effect lies in that: the circular groove is used as the positioning groove to facilitate processing, and the anti-rotation limiting pin arranged in the circular groove can ensure relative positions of the contact arm and the contact finger base.

Further, the contact finger base is provided with a through hole along the radial direction of the contact finger base, and the through hole is used for the anti-rotation limiting pin to pass through to be connected with the contact arm in the contact finger base.

The beneficial effect lies in that: by arranging the through hole for the anti-rotation limiting pin to pass through in the contact finger base, the operator can limit the rotation of the contact finger base after arranging a contact arm support in the contact finger base, thus simplifying operation steps and reducing a task load.

Further, more than two elastic support structures are arranged.

The beneficial effect lies in that: the increase of a number of the elastic support structures can ensure an accuracy of a corrected posture of the contact finger base.

Further, the elastic support structure includes a blind hole arranged in the peripheral surface of the contact arm along the radial direction of the contact arm, a support rod is arranged in the blind hole, and the elastic support structure further includes a spring arranged between the support rod and a bottom of the blind hole.

The beneficial effect lies in that: the combination of the support rod and the spring is used as the elastic support structure, which is simple in structure and convenient to realize.

Further, the peripheral surface of the contact finger base is provided with a heat dissipation groove extending along a circumferential direction to increase a heat exchange area of the contact finger base.

The beneficial effect lies in that: a concave-convex structure of the heat dissipation groove increases the heat exchange area of the contact finger base, so that heat can be better dissipated to ensure a working stability, and a weight of the contact finger base can also be reduced by arranging the heat dissipation groove, and a downward inclination degree of the contact finger base is reduced, so that the posture of the contact finger base can be corrected without very large force.

Further, the contact finger base is provided with heat dissipation holes located at two opposite sides of the peripheral surface of the contact finger base, wherein a position of the heat dissipation hole at one side is corresponding to the elastic support structure.

The beneficial effect lies in that: the heat dissipation holes are arranged in the contact finger base, thus reducing the weight of the contact finger base, and correspondingly reducing a pressure on the contact arm and the downward inclination degree of the contact finger base. Meanwhile, the heat dissipation hole at one side is corresponding to the elastic support structure, so that the heat dissipation holes arranged at two opposite sides are respectively located at a top part and a bottom part of the contact finger base, and heat can be better discharged through the heat dissipation holes; and moreover, the heat dissipation holes are arranged in the top part and the bottom part of the contact finger base, which facilitates processing compared with a mode of uniform distribution along the circumferential direction of the contact finger base.

wherein: 10 refers to tulip contact; 11 refers to tulip contact body; 12 refers to tulip contact piece; 13 refers to support piece; 14 refers to plug cavity; 15 refers to inner spring; 16 refers to outer spring; 20 refers to handcart circuit breaker; 21 refers to chassis handcart; 22 refers to valve push plate; 23 refers to fixedly sealed pole; 24 refers to contact arm; 241 refers to anti-rotation screw; 242 refers to elastic support structure; 243 refers to heat dissipation hole; 244 refers to circular groove; 25 refers to contact finger base; 251 refers to heat dissipation groove; 252 refers to heat dissipation hole; 253 refers to positioning screw; 254 refers to through hole; 255 refers to swing contact finger; 26 refers to heat dissipation frame; 27 refers to operation mechanism; and 28 refers to fixed contact.

DETAILED DESCRIPTION

The detailed embodiments of a contact device of a handcart circuit breaker and a handcart circuit breaker in the present invention are now described with reference to the drawings in the description.

Figure 1:
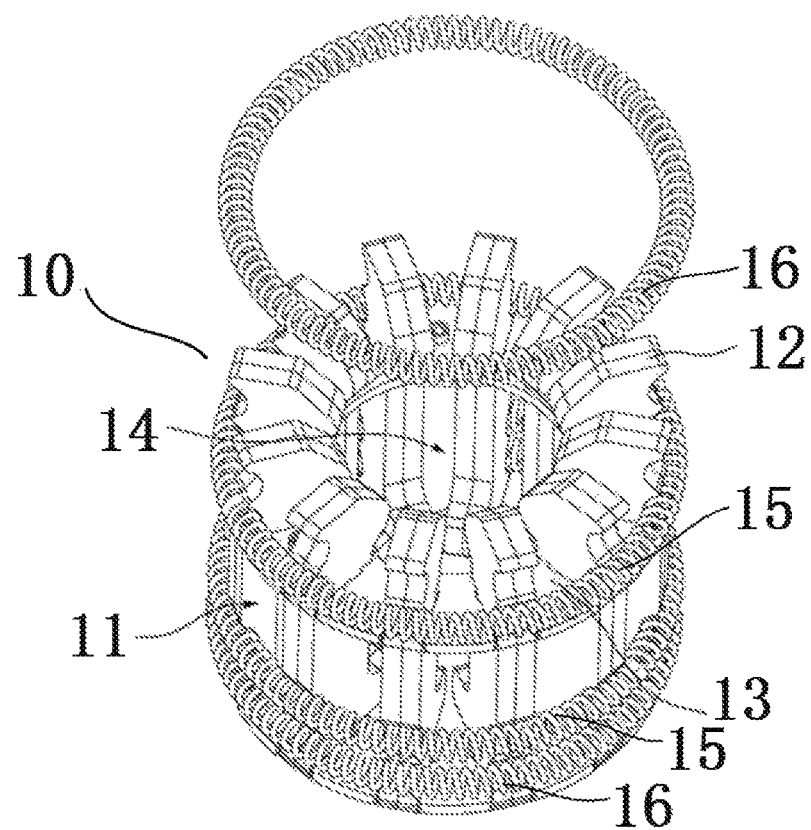
FIG. 1 is a structure diagram of a tulip contact in the prior art.
Figure 2:
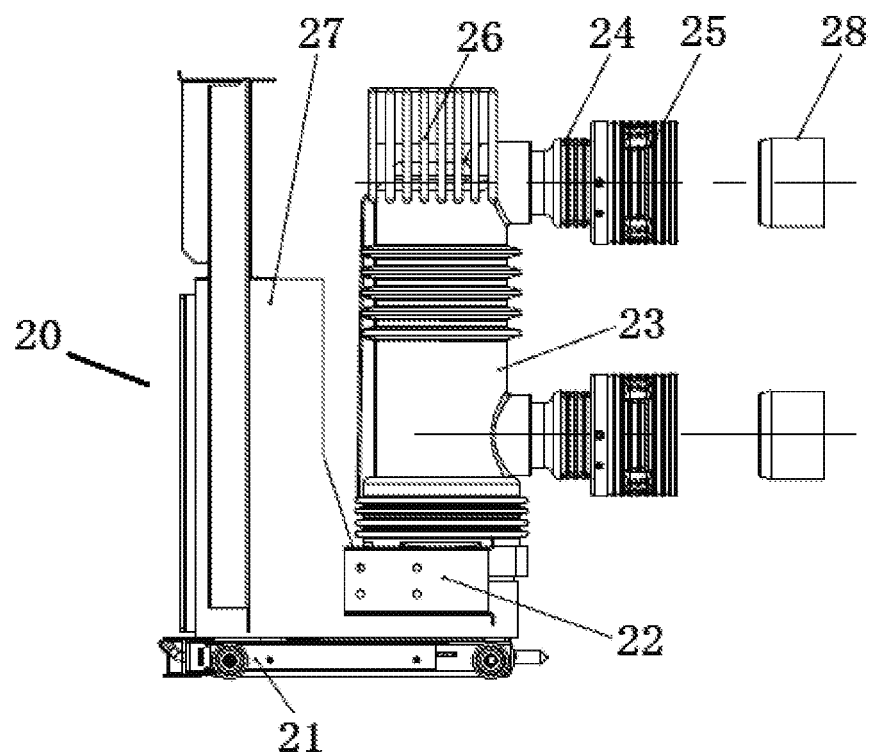
FIG. 2 is a structure diagram of a handcart circuit breaker in the present invention.

FIG. 2 shows an embodiment of a handcart circuit breaker in the present invention: a handcart circuit breaker 20 includes a chassis handcart 21, the chassis handcart 21 is provided with a valve push plate 22, the valve push plate 22 is provided with a fixedly sealed pole 23, a bottom part of the fixedly sealed pole 23 is connected with the valve push plate 22, a top part of the fixedly sealed pole 23 is provided with a heat dissipation frame 26, a side surface of the fixedly sealed pole 23 is provided with two contact devices arranged at an interval along an up and down direction shown in the drawing, the contact device is used for being in plugging fit with a fixed contact 28 to correspondingly complete a switching on action, and a side of the fixedly sealed pole 23 opposite to the contact device is provided with an operation mechanism 27.

Figure 3:
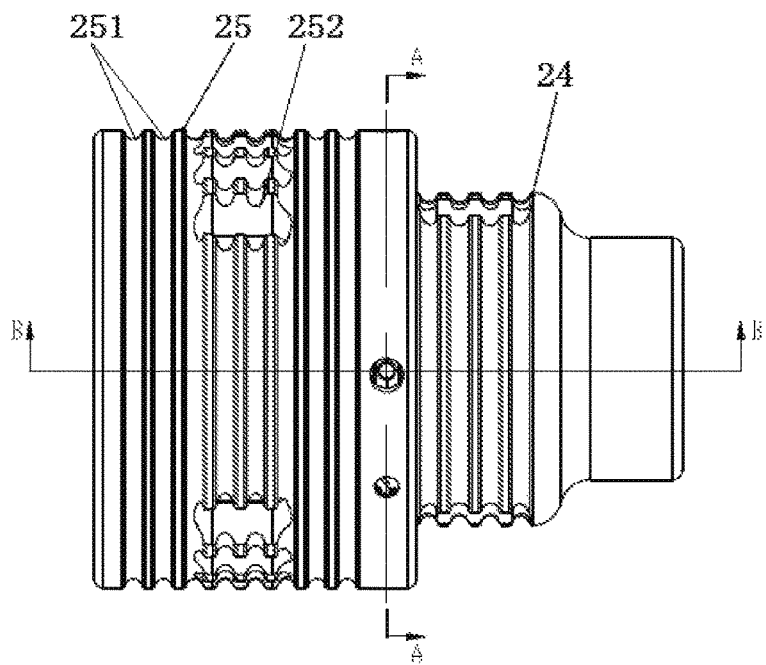
FIG. 3 is a structure diagram of a contact device of the handcart circuit breaker in the present invention.
Figure 7:
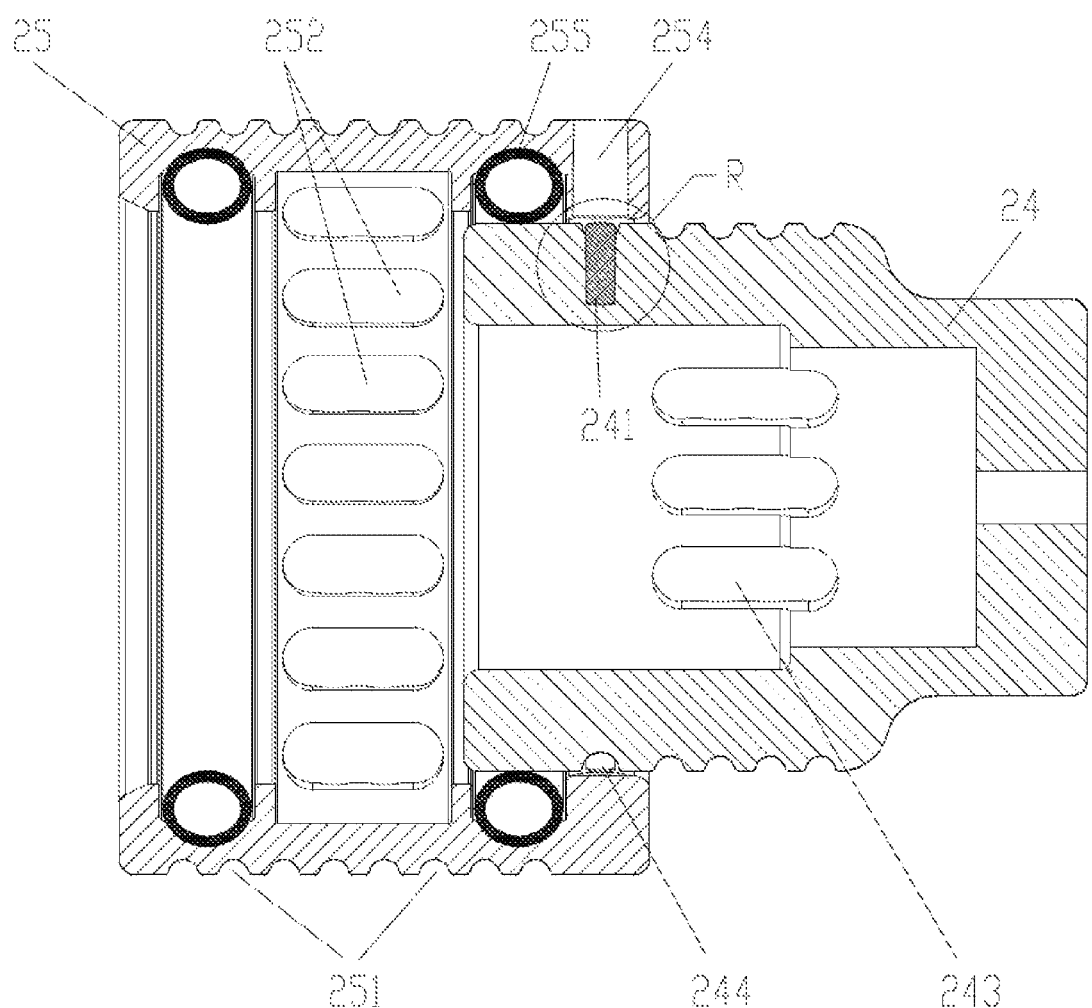
FIG. 7 is a sectional view along a B-B line in Fig. 3.

As shown in FIG. 3 and. FIG. 7, the contact device of the handcart circuit breaker 20 in the present invention includes a contact finger base 25 and a contact arm 24, a rear end of the contact arm 24 is fixedly connected with the fixedly sealed pole 23, and a front end of the contact arm 24 is matched with the contact finger base 25. The contact finger base 25 includes a cylinder used as a main body, the cylinder has an inner cavity sleeved on a surface of the contact arm 24, two ends of the inner cavity in an axial direction are respectively provided with a contact finger groove, the contact finger grooves are both provided with a spring contact finger 225, and the spring contact finger 255 is a conductive connector commonly used in the prior art, with a meshing force being about one third of a meshing force of a tulip contact, and can realize the conductive connection between the contact finger base 25 and the contact arm 24, and between the fixed contact 28 and the contact finger base 25.

A peripheral surface of the cylinder is provided with a concave groove extending along a circumferential direction to be used as a heat dissipation groove 251, a groove wall and a groove bottom of the heat dissipation groove 251 increase a heat dissipation area of the cylinder, and a plurality of heat dissipation grooves 251 are arranged at intervals along an axial direction of the cylinder. Except for the heat dissipation groove 251, the cylinder is also provided with heat dissipation holes 252 communicating an inside and an outside of a plug cavity. An inner circular groove is arranged at a position in plugging fit with the fixed contact 28 in the cylinder, and the heat dissipation holes 252 are arranged in a groove bottom of the inner circular groove. The heat dissipation holes 252 are centrally arranged at corresponding upper and lower sides of the cylinder in use, the heat dissipation holes 252 at the upper and lower sides are combined to form a heat dissipation channel, an extending direction of the heat dissipation channel is consistent with a moving direction of rising and falling of air, a cold air flow can enter the cylinder through the heat dissipation holes at the lower side, while a hot air flow can be discharged from the cylinder through the heat dissipation holes at the upper side. In order to ensure an overall heat dissipation effect of the contact device, the contact arm 24 is also provided with heat dissipation holes 243.

Figure 4:
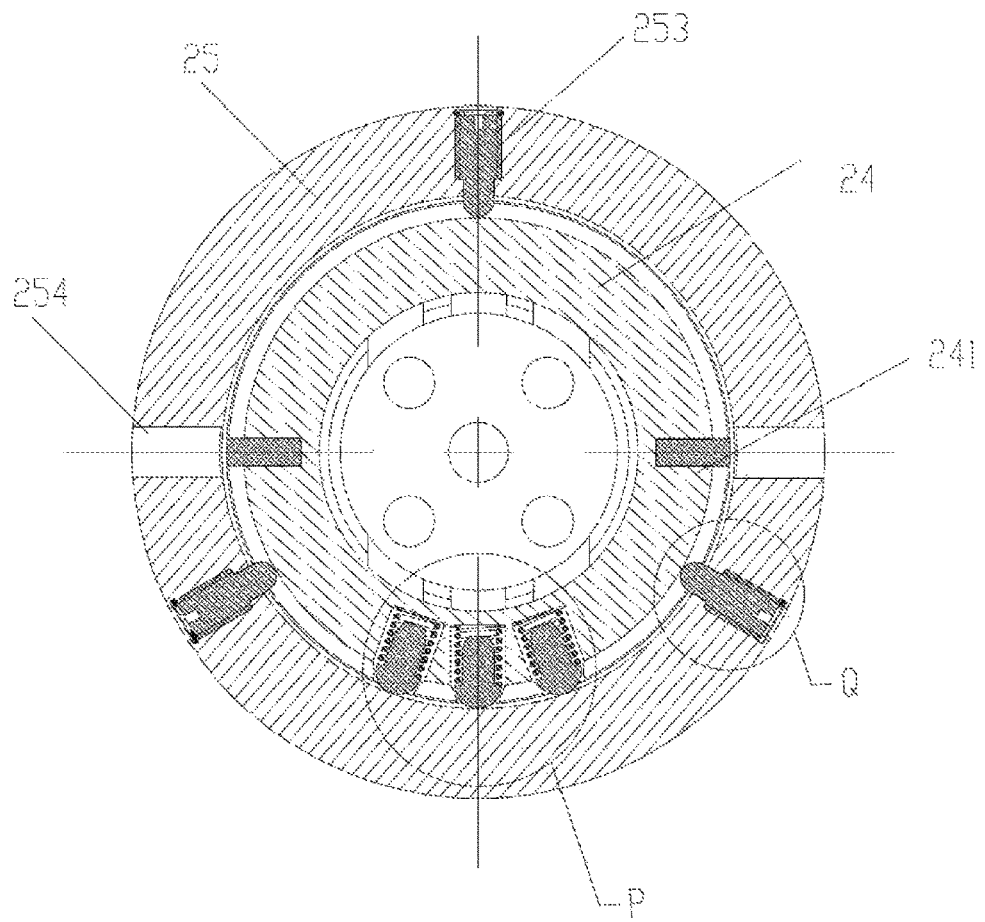
FIG. 4 is a sectional view along an A-A line in FIG. 3.
Figure 5:
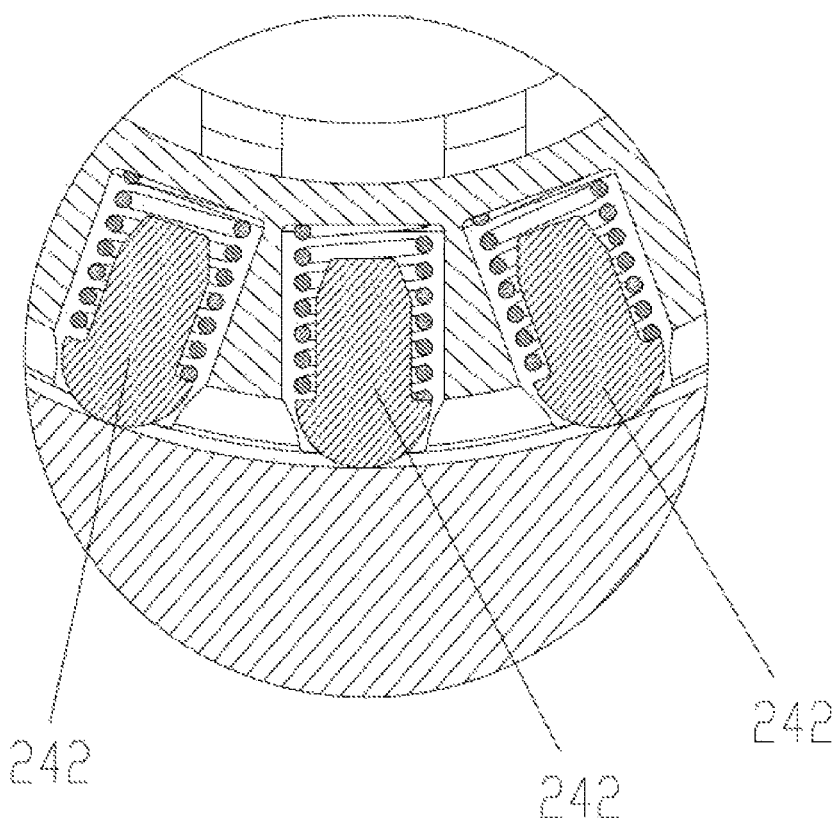
Fig. 5 is an enlarged diagram of a part P in FIG. 4.
Figure 6:
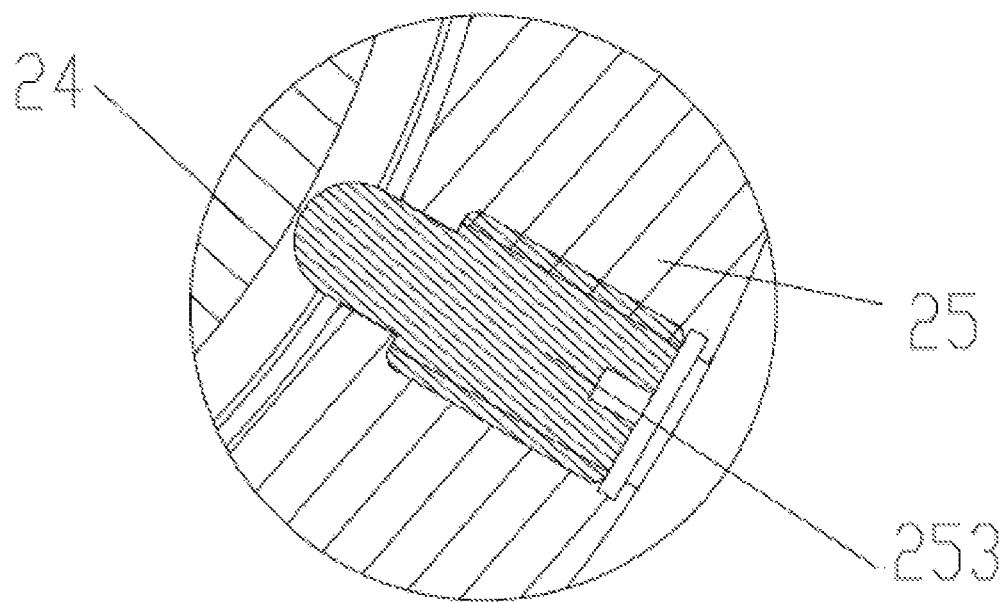
FIG. 6 is an enlarged diagram of a part Q in FIG. 4.
Figure 8:
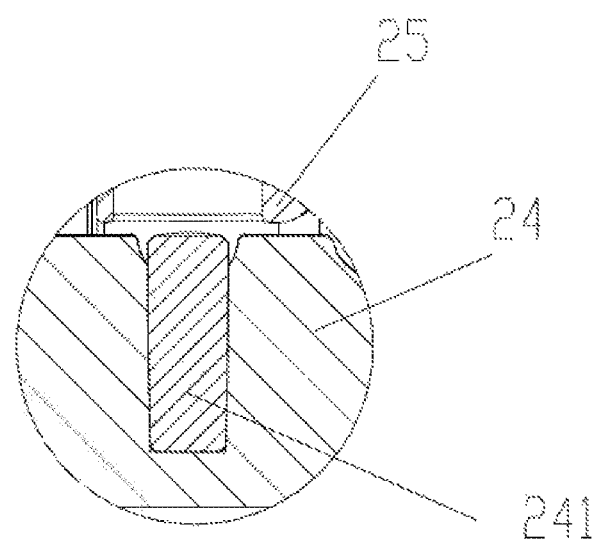
FIG. 8 is an enlarged diagram of a part R in FIG. 7.

As shown in FIG. 7 and FIG. 8, when the contact finger base 25 is matched with the contact arm 24, a front end of the contact arm 24 extends into the inner cavity of the contact finger base 25, so that the contact finger base 25 is correspondingly sleeved on an end part of the contact arm 24, in order to ensure stable connection of the contact arm 24 and the contact finger base 25, a circular groove 244 arranged along a circumferential direction of the contact arm 24 is arranged on the peripheral surface of a matching part of the contact arm 24 and the contact finger base 25, and the circular groove 244 is an arc-shaped groove with an arc-shaped cross-sectional profile. As shown in FIG. 4, FIG. 5 and FIG. 6, the cylinder of the contact finger base 25 is provided with a positioning screw hole which is corresponding to the arc-shaped groove and opened along a radial direction of the cylinder, a hole wall of the positioning screw hole is provided with an internal thread, a positioning screw 253 used as a support pin is connected in the positioning screw hole through the thread, and an end part of the positioning screw 253 facing the positioning groove is of a bulb structure. In the axial direction of the contact arm, a size of the circular groove used as the positioning groove is larger than a size of a fitting end of the positioning screw 253 and the positioning groove, i.e., the bulb structure, while a diameter of a circle corresponding to the fitting end of the three positioning screws 253 is larger than a diameter of a circle corresponding to the groove bottom of the circular groove 244, and the contact finger base 25 is connected with the contact arm 24 in a floatable manner through the matching of the positioning screw 253 and the circular groove 244. The contact arm 24 is supported by the positioning screw 253, and the bulb structure is matched with the circular groove 244 to realize the centering arrangement of the contact arm 24, so that the contact arm 24 is automatically adapted to a position in the contact finger base 25.

Due to a floating connection structure of the contact arm 24 in the contact finger base 25, the contact arm 24 not only can move in the radial direction of the contact finger base 25, but also can rotate in an axial direction around the contact finger base 25. Therefore, an anti-rotation structure for limiting the rotation of the contact arm 24 is also arranged between the contact arm 24 and the contact finger base 25: the circular groove 244 is internally provided with two screw holes extending along a radial direction of the contact arm 24, and the two screw holes are located on a diameter of a circumference formed by the circular groove 244. Not only the positioning screw hole for the positioning screw 253 to pass through is arranged in the contact finger base 25, but also a through hole 254 for an anti-rotation screw 241 to pass through is arranged in the contact finger base 25. The anti-rotation screw 241 used as an anti-rotation limiting pin passes through the through hole 254, and is finally screwed in the screw hole arranged in the contact arm 24. A head part of the anti-rotation screw 241 above the circumferential surface of the contact arm 24 is spaced apart from the inner wall of the contact finger base, but can be in stop fit with the bulb structure of the positioning screw 253, so as to stop the rotation of the contact finger base 25.

As shown in FIG. 4 and FIG. 5, a part of the contact finger base 25 is sleeved on the peripheral surface of the front end of the contact arm 24, and the contact finger base 25 is in a downwardly inclined overhanging state. Therefore, in order to correct the downward inclination of the contact finger base 25 and ensure the concentric arrangement of the contact finger base 25 and the contact arm 24, an elastic support structure 242 is arranged on the peripheral surface of the contact arm 24. Three elastic support structures 242 are arranged with the same structure, including a blind hole arranged along the radial direction of the contact arm 24 and located in the bottom part of the contact arm 24, the blind hole is internally provided with a support rod, the support rod includes a small diameter section integrally located in the blind hole and a large diameter section close to a hole edge of the blind hole, a step formed by a radial size change is arranged between the large diameter section and the small diameter section, a spring is sleeved on the small diameter section of the support rod, one end of the spring is pressed on the step and the other end is pressed on a bottom of the blind hole, and a downward inclination posture of the contact finger base 25 is corrected by an elastic force generated by spring deformation. A head of the support rod supported on the inner wall of the contact finger base 25 is of the bulb structure.

When the fixed contact 28 is in plugging fit with the contact device in the present invention, the fixed contact 28 only needs to overcome the elastic force of the spring contact finger 255 to enter the plug cavity, the spring contact finger 255 is a conductive connector commonly used in the prior art, with a small meshing force being about one third of a meshing force of the tulip contact, and less resistance can be received in switching on of the handcart circuit breaker 20, so that a "climbing" phenomenon can be effectively improved.

In other embodiments, other structures can also be used in the positioning groove, for example, local grooves arranged at intervals on the peripheral surface of the contact arm are used, and common structures comprise a ball pit, an arc-shaped groove, etc., and the positioning groove is not limited to continuous groove bodies arranged along the axial direction of the contact arm.

In other embodiments, other structures can also be used in a stop pin supporting the contact arm, for example, a bolt is inserted into the contact finger base to support the contact arm, and at the moment, the relative fixation between the bolt and the contact finger base needs to be ensured, so that the bolt can be welded to the contact finger base or fixed on the contact finger base by interference fit.

In other embodiments, the number of the elastic support structures can be correspondingly adjusted according to volumes and weights of the contact arm and the contact finger base as well as a size of an arrangement space between the contact arm and the contact finger base, and one, two or more than four elastic support structures are correspondingly arranged instead of arranging the three elastic support structure.

In other embodiments, the elastic support structure can be arranged on the contact finger base.

In other embodiments, the elastic support structure can be replaced by other forms, for example, the blind hole is arranged in the inner wall of the contact finger base or the peripheral surface of the contact arm, a rubber column supported on the bottom of the blind hole is arranged in the blind hole, and the rubber column supports the contact arm through the elastic force generated by self-compression to correct the downward inclination posture of the contact arm; and alternatively, an elastic piece can be arranged on the inner wall of the contact finger base or the peripheral surface of the contact arm, and when the contact finger base is sleeved on the contact arm, the elastic piece is compressed to generate the elastic force for correcting the downward inclination posture of the contact finger base.

The structure of the contact device of the handcart circuit breaker in the present invention is the same as that of the contact device of the handcart circuit breaker in the embodiment of the switch cabinet above. Therefore, the embodiment regarding the contact device of the handcart circuit breaker will not be elaborated repeatedly.

The above-mentioned specific embodiments have further explained the objects, technical solutions and beneficial effects of the invention in detail. It should be understood that the foregoing is merely detailed embodiments of the invention, and is not intended to limit the scope of protection of the invention. Any modifications, equivalent substitutions and improvements made within the spirits and principles of the invention shall be included in the scope of protection of the invention.

The invention claimed is:

1. A contact device of a handcart circuit breaker, comprising a contact arm and a moving contact,
a rear end of the contact arm being a pole fixing end, a front end of the contact arm being a contact connecting end, the rear end of the contact arm being provided with a pole fixing structure for being fixed on a fixedly sealed pole of a handcart circuit breaker, and the front end of the contact arm being provided with a moving contact assembling structure for assembling the moving contact,
wherein:
the moving contact comprises a contact finger base and a spring contact finger, wherein:
the contact finger base has a cylindrical structure, inner walls at two ends of which in an axial direction are respectively provided with a contact finger groove, the contact finger grooves at the two ends are respectively provided with the spring contact finger, and the spring contact fingers at the two ends are respectively used for plugging the contact arm and a fixed contact;
a rear end of the contact finger base is sleeved on the front end of the contact arm, and the contact finger base is provided with more than three support pins extending into an inner cavity of the contact finger base;
a positioning groove is arranged in a peripheral surface of the front end of the contact arm for sleeving the contact finger base, and the positioning groove is matched with the support pin;
in an axial direction of the contact arm, a size of the positioning groove is larger than a size of a fitting end of the support pin; a diameter of a circle corresponding to the fitting end of each support pin is larger than a diameter of a circle corresponding to a groove bottom of each positioning groove; and the contact finger base is connected with the contact arm in a floatable manner through the matching of the support pin and the positioning groove; and
an elastic support structure is arranged between the peripheral surface of the contact arm and the inner wall of the contact finger base, and the elastic support structure is located below the contact device in use to correct downward inclination of a front part of the contact finger base.

2. The contact device of a handcart circuit breaker according to claim 1, wherein the positioning groove is an arc-shaped groove with an arc-shaped cross-sectional profile, and the fitting end of the support pin is of a bulb structure.

3. The contact device of a handcart circuit breaker according to claim 1, wherein the contact finger base is provided with a threaded hole extending along a radial direction of the contact finger base, and the support pin is provided with an external thread matched with the threaded hole, so that the support pin is arranged in the contact finger base by threaded connection.

4. The contact device of a handcart circuit breaker according to claim 1, wherein the peripheral surface of the contact arm is provided with a circular groove arranged along a circumferential direction of the contact arm, the circular groove correspondingly forms the positioning groove, and the circular groove is internally provided with an anti-rotation limiting pin in stop fit with the contact finger base to limit rotation of the contact finger base.

5. The contact device of a handcart circuit breaker according to claim 4, wherein the contact finger base is provided with a through hole along the radial direction of the contact finger base, and the through hole is used for the anti-rotation limiting pin to pass through to be connected with the contact arm in the contact finger base.

6. The contact device of a handcart circuit breaker according to claim 1, wherein more than two elastic support structures are arranged.

7. The contact device of a handcart circuit breaker according to claim 1, wherein the elastic support structure comprises a blind hole arranged in the peripheral surface of the contact arm along the radial direction of the contact arm, a support rod is arranged in the blind hole, and the elastic support structure further comprises a spring arranged between the support rod and a bottom of the blind hole.

8. The contact device of a handcart circuit breaker according to claim 1, wherein the peripheral surface of the contact finger base is provided with a heat dissipation groove extending along a circumferential direction to increase a heat exchange area of the contact finger base.

9. The contact device of a handcart circuit breaker according to claim 1, wherein the contact finger base is provided with heat dissipation holes located at two opposite sides of the peripheral surface of the contact finger base, wherein a position of the heat dissipation hole at one side is corresponding to the elastic support structure.

10. A handcart circuit breaker, comprising a chassis handcart, a fixedly sealed pole and a contact device arranged on the fixedly sealed pole, wherein:
the contact device is the contact device of the handcart circuit breaker according to claim 1.

* * * * *